United States Patent
Ploetz et al.

(10) Patent No.: US 7,690,488 B2
(45) Date of Patent: Apr. 6, 2010

(54) ROLLER FREEWHEEL

(75) Inventors: Volker Ploetz, Herzogenaurach (DE); Swen Dörrie, Herzogenaurach (DE); Frieder Altmann, Pommersfelden (DE); Helmut Kalb, Hallerndorf (DE); Alois Leisgang, Hallerndorf (DE)

(73) Assignee: Schaeffler KG (DE)

( * ) Notice: Subject to any disclaimer, the term of this patent is extended or adjusted under 35 U.S.C. 154(b) by 437 days.

(21) Appl. No.: 11/676,918

(22) Filed: Feb. 20, 2007

(65) Prior Publication Data

US 2007/0246319 A1    Oct. 25, 2007

(30) Foreign Application Priority Data

Feb. 18, 2006    (DE) .................. 10 2006 007 652

(51) Int. Cl.
 *F16D 41/067*    (2006.01)
(52) U.S. Cl. ........................................ 192/45
(58) Field of Classification Search ............... None
 See application file for complete search history.

(56) References Cited

U.S. PATENT DOCUMENTS 3,055,472 A    9/1962    Sauzedde
3,339,687 A    9/1967    Cowles
3,902,580 A    9/1975    Johnson .................. 192/45
2005/0034951 A1*    2/2005    Takasu .................. 192/45

FOREIGN PATENT DOCUMENTS

| DE | 1 254 916 | 11/1967 |
| DE | 69 41 547 U | 4/1971 |
| DE | 23 44 960 | 4/1975 |
| DE | 33 21 358 A1 | 12/1984 |
| DE | 689 01 694 | 12/1992 |
| DE | 200 09 895 U1 | 11/2000 |

\* cited by examiner

*Primary Examiner*—Rodney H Bonck
(74) *Attorney, Agent, or Firm*—Ostrolenk Faber LLP

(57) ABSTRACT

A roller freewheel comprises
 an outer ring which is configured as a sheet metal part shaped without cutting and has a cylindrical outer surface and an inner surface which is provided with clamping ramps,
 a plurality of clamping rollers which are sprung against the clamping ramps, and
 a cage which is arranged fixedly in terms of rotation in the outer ring, is configured as a sheet metal part shaped without cutting and to which springs are fastened which are provided for suspending the clamping rollers.

9 Claims, 2 Drawing Sheets

A-A

A-A

ROLLER FREEWHEEL

CROSS REFERENCE TO RELATED APPLICATION

This application claims the benefit of the filing date of German Patent Application No. 10 2006 007652.4 filed 18 Feb. 2006, the disclosure of which is hereby incorporated by reference.

FIELD OF THE INVENTION

The invention relates to a roller freewheel which is suitable, in particular, for torque converters and for automatic transmissions and, moreover, can also be used in the field of industry.

BACKGROUND OF THE INVENTION

A roller freewheel is known, for example, from DE 1 254 916 B. The outer ring of this roller freewheel is configured as a key track ring which is also called a cup. In order to increase the stability, the cup is arranged within a second cup, the shape of the second cup being adapted to the clamping ramp contour of the inner cup. No statements are made in DE 1 254 916 B about the installation of the roller freewheel in a relatively large structural unit, for instance in a vehicle transmission.

OBJECT OF THE INVENTION

The invention is based on the object of specifying a clamping roller freewheel clutch which can be used in a particularly flexible manner and is of space saving construction.

SUMMARY OF THE INVENTION

According to the invention, this object is achieved by a roller freewheel having the features of claim 1. The roller freewheel has an outer ring which is manufactured as a sheet metal shaped part, clamping ramps being formed on its inner side, while the outer surface of the outer ring is cylindrical. A cylindrical surface is also understood to be a surface with grooving, but not a surface which has a clamping ramp shape. The cylindrical outer shape of the outer ring makes it possible to insert the latter into a hole of a force-absorbing connection part. Special connection constructions having a contour which is adapted to the clamping ramp shape are not required.

In one preferred embodiment, the outer ring has on its inside, in each case between two clamping ramps, a groove-shaped depression which extends in the axial direction, also referred to as assembly groove or axial groove. In contrast to the clamping ramps, the axial grooves are in each case formed symmetrically with respect to a plane in which the rotational axis of the roller freewheel lies. The outer surface of the outer ring does not deviate from the cylindrical shape in the region of the axial grooves. The extent of an axial groove in the circumferential direction is preferably less than the extent of a clamping ramp in the same direction. The reduction in wall thickness of the outer ring brought about by the axial grooves is comparable with the reduction in wall thickness of the outer ring by the forming of the clamping ramps. The minimum wall thickness of the outer ring in the region of an axial groove preferably deviates from the minimum wall thickness of the outer ring in the region of a clamping ramp by not more than 20%. As seen in the circumferential direction, in one preferred embodiment, more then 70% of the inner surface of the outer ring is formed by clamping ramps or axial grooves. It has surprisingly been shown that the axial grooves contribute significantly to improving the roundness of the outer surface of the outer ring. This in turn increases the lifetime of the roller freewheel.

A plurality of clamping rollers which are guided by means of a cage are situated within the outer ring. The cage is arranged fixedly in terms of rotation in the outer ring, in particular with a form-fitting connection, the outer contour of the cage preferably being adapted to the clamping ramp contour of the outer ring. Springs, preferably individual leaf springs, in particular leaf springs having a triangular shape, which are fastened to the cage are provided for suspending the clamping rollers. There are constantly uniform suspension properties as a result of the fact that the cage cannot be rotated relative to the outer ring.

In the same way as the outer ring, the cage is manufactured as a sheet metal part which is shaped without cutting. In one refinement which is favorable in terms of manufacturing technology and assembly, the cage has only a single cage ring which bears against a rim of the outer ring. Webs extend from the cage ring in the axial direction of the freewheel, a spring being fastened to each web in order to suspend in each case one clamping roller. A snap-action connection is preferably produced between the spring and the web, one part of the spring engaging into a holding contour, in particular an opening, of the web.

In one advantageous refinement, the webs of the cage form stops for the clamping rollers. At the same time, the webs are preferably shaped in such a way that a residual spring travel of the springs constantly remains. At least one part of each web extends in a radial plane, that is to say in a plane which intersects the axis of symmetry of the roller freewheel. What is known as the center section of a web which is arranged in a radial plane is preferably adjoined by at least one holding projection which is angled away with respect to the center section and, in particular, makes assembly easier. The holding projection is situated in a region radially outside the center section.

The cage of the roller freewheel is preferably manufactured from a substantially circular disk-shaped sheet metal blank, the edge of the sheet metal blank mirroring the contour of the clamping ramps at least in sections, in a manner which deviates from an exact circular shape. The cage is preferably formed from at least 30%, in particular at least 50%, of the mass of the circular part which is used. In other words, a maximum of 70% of the surface area of the sheet metal blank cannot be found in the end product, that is to say in the cage.

One exemplary embodiment of the invention will be explained in greater detail in the following text using a drawing, in which:

DETAILED DESCRIPTION OF THE DRAWING

Figure 1:
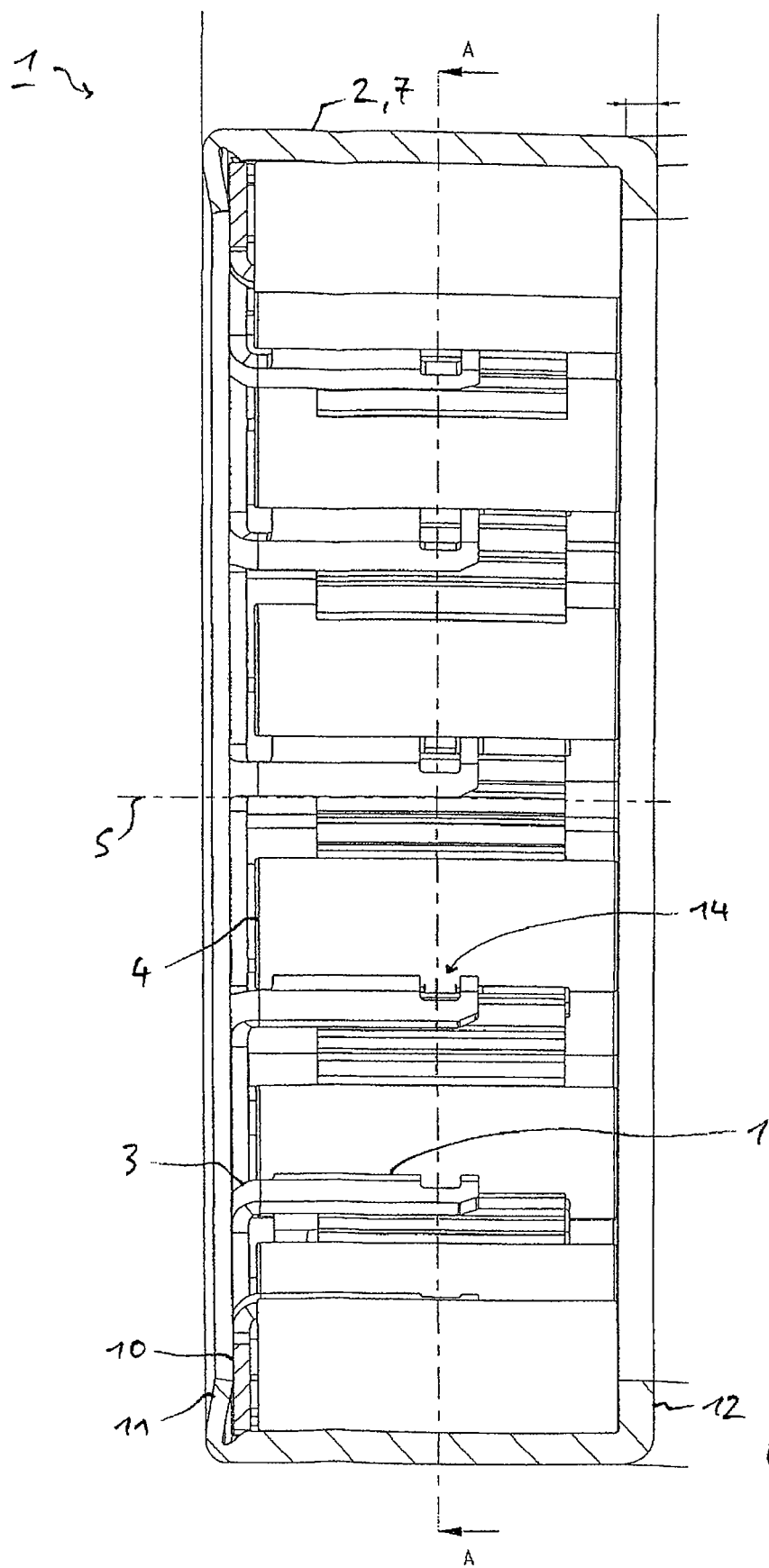
FIGS. 1 and 2 show different sections of a roller freewheel.
Figure 2:
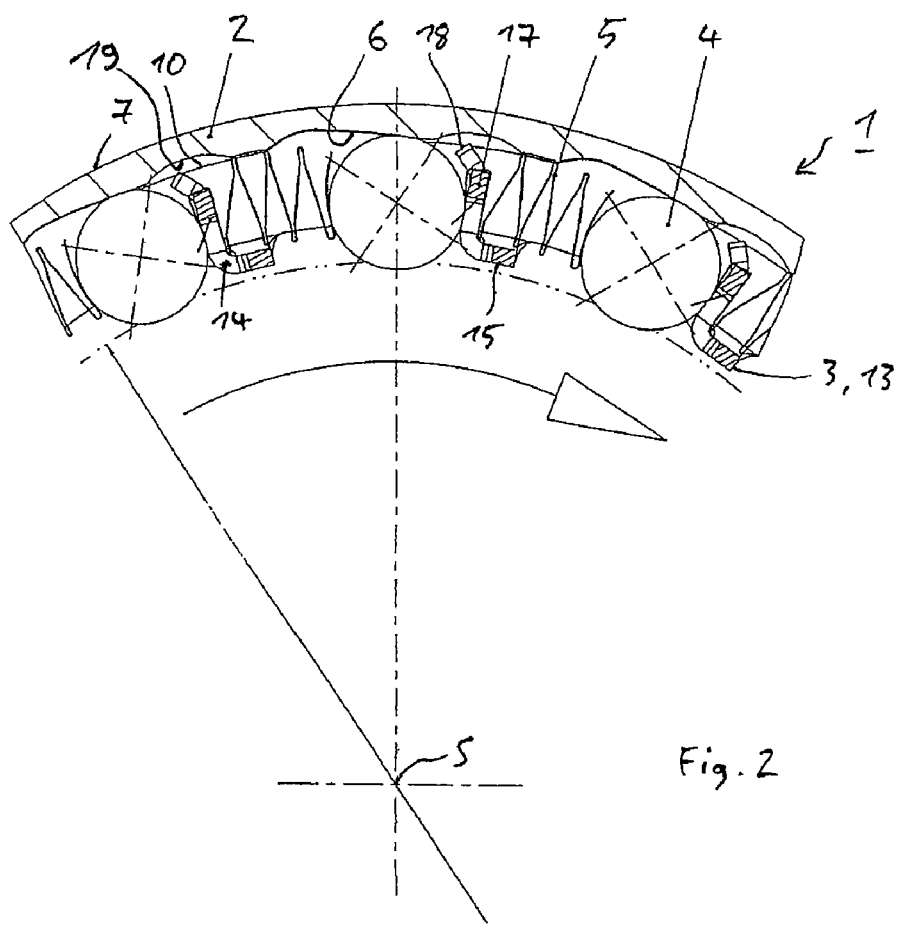
Figure 4:
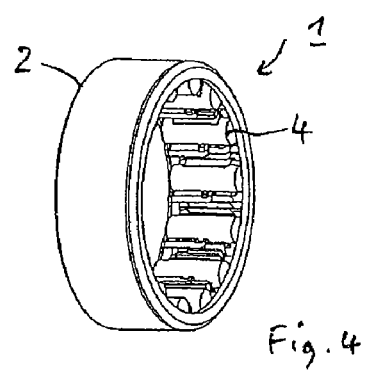
FIG. 4 shows a perspective view of the roller freewheel according to FIGS. 1 and 2.

FIGS. 1, 2 and 4 show a roller freewheel 1 which is composed of an outer ring 2, a cage 3, a plurality of clamping rollers 4 and a number of springs 5 which corresponds to the number of clamping rollers 4. All the abovementioned parts 2, 3, 4, 5 are manufactured from metallic materials. The roller freewheel 1 is suitable, in particular, for installation in a torque converter or in an automatic transmission. The roller freewheel 1 can likewise be used universally in the field of industry. A shaft which interacts with the clamping rollers 4 is not shown. Reference is made to DE 200 09 895 U1 with regard to the fundamental method of operation of the roller freewheel 1.

The outer ring 2 is manufactured as a sheet metal shaped part, clamping ramps 6 which interact with the clamping rollers 4 being formed on the inner side of the outer ring 2, while the outer surface 7 of the outer ring 2 is cylindrical. The outer ring 2 therefore has a wall thickness which is not constant. The clamping ramps 6 are shaped in such a way that, as indicated by an arrow in FIG. 2, a rotation of the shaft which makes contact with the clamping rollers 4 is blocked in the clockwise direction. The springs 5 in the form of multiply folded leaf springs having a triangular cross section in the view according to FIG. 2 hold the clamping rollers 4 in permanent clamping readiness.

Figure 3:
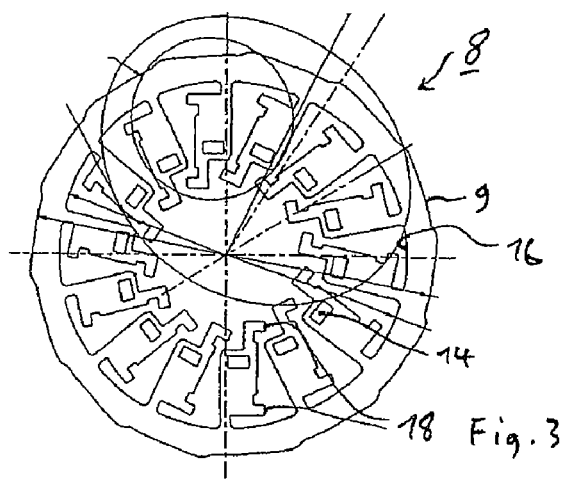
FIG. 3 shows a sheet metal blank which can be used to manufacture a cage of the roller freewheel according to FIGS. 1 and 2.

The shape of the cage 3 also becomes clear from FIG. 3 which shows a sheet metal blank 8, from which the cage 3 is shaped without cutting. The edge 9 of the sheet metal blank 8 substantially mirrors the shape of the clamping ramps 6, with the result that the cage 3 can be mounted in the outer ring 2 in a manner which is secured against rotation. Faulty mounting of the cage 3 is precluded by the form-fitting connection between the cage 3 and the outer ring 2. The edge 9 delimits a cage ring 10 which is arranged as part of the cage 3 in a plane which is perpendicular with respect to the axis of symmetry S of the roller freewheel 1. As is apparent from FIG. 1, the cage ring 10 bears against a rim 11 of the outer ring 2. In comparison with a further rim 12 of the outer ring 2, the rim 11 has a reduced wall thickness.

In the axial direction of the roller freewheel 1, that is to say in a manner which is bent away at right angles from the cage ring 10, the cage ring 10 is adjoined by webs 13, to which in each case one spring 5 is fastened. An opening 14 which represents a holding contour for producing a snap-action connection between the spring 5 and the web 13 is situated in each web 13. In cross section, as shown in FIG. 2, the web 13 substantially has an L-shape, the shorter L-limb 15 adjoining the inner edge 16 of the cage ring 10 and extending in the tangential direction of the roller freewheel 1. The longer L-limb of the web 13 which extends in the radial direction of the cage 3 is denoted as center section 17 and forms, as can be seen from FIG. 2, a stop for a clamping roller 4. The center section 17 is adjoined by two holding projections 18 which are bent away obliquely from the former and extend approximately parallel to the surface of the adjacent clamping roller 4. Said holding projections 18 prevent the clamping rollers 4 from falling radially outward during the assembly of the roller freewheel 1. As is apparent, in particular, from FIG. 3, the holding projections 18 are arranged in the axially outer regions of the clamping rollers 4.

Each holding projection 18 dips partially into an axial groove 19 which is formed on the inner circumference of the outer ring 2. An axial groove 19 which, like the clamping ramps 6, is formed without cutting in the outer ring 2, is located in each case between two clamping ramps 6. The arrangement comprising the cage 3, the springs 5 and the clamping rollers 4 can be introduced into the outer ring 2 as a preassembled structural unit.

The outer ring 2 is pressed into an opening of a connection part (not shown). The roller freewheel 1 which is configured as a sleeve-type freewheel is therefore suitable for areas of application which, according to the prior art, were not suitable for the use of sleeve-type freewheels. The roller freewheel 1 is designed to transmit a torque of more than 100 Nm. By way of the outer ring 2 which is configured as a sheet metal shaped part, the roller freewheel 1 is distinguished by a particularly small radial installation space requirement.

LIST OF DESIGNATIONS

1 Roller freewheel
2 Outer ring
3 Cage
4 Clamping roller
5 Spring
6 Clamping ramp
7 Outer surface
8 Sheet metal blank
9 Edge
10 Cage ring
11 Rim
12 Rim
13 Web
14 Opening
15 L-limb
16 Inner edge
17 Center section
18 Holding projection
19 Axial groove
S Axis of symmetry

The invention claimed is:

1. A roller freewheel, having
   an outer ring which is configured as a sheet metal part and has a cylindrical outer surface, an inner surface which is provided with clamping ramps, a first rim, and a second rim,
   a plurality of clamping rollers which are sprung against the clamping ramps, and
   a cage which is arranged fixedly in terms of rotation in the outer ring, is configured as a sheet metal part and to which springs are fastened which are provided for suspending the clamping rollers, wherein the cage is comprised of a single continuous cage ring which bears against the first rim of the outer ring and is disposed between the first rim and the second rim of the outer ring, and wherein the cage is held in the outer ring in a form-fitting manner, with the cage ring having a contour that substantially mirrors the shape of the clamping ramps.

2. The roller freewheel as claimed in claim 1, wherein the cage has webs which extend at right angles to the cage ring and serve to hold the springs.

3. The roller freewheel as claimed in claim 2, wherein in each case one spring is snapped onto a web.

4. The roller freewheel as claimed in claim 3, wherein the web has an opening which serves to hold the spring.

5. The roller freewheel as claimed in claim 2, wherein the webs form stops for the clamping rollers.

6. The roller freewheel as claimed in claim 5, wherein each web has a center section which extends in a radial plane and at least one holding projection which is angled away from the former.

7. The roller freewheel as claimed in claim 1, wherein the springs are configured as folded leaf springs.

8. The roller freewheel as claimed in claim 1, wherein the cage is manufactured from a disk-shaped sheet metal blank, the utilization of the surface area being at least 30%.

9. The roller freewheel as claimed in claim 1, wherein the outer ring has axial grooves between clamping ramps which are adjacent in the circumferential direction.

* * * * *